(12) United States Patent
Cooper

(10) Patent No.: US 11,292,605 B2
(45) Date of Patent: Apr. 5, 2022

(54) MOUNTING SYSTEM AND MOUNTING METHOD FOR GAS TURBINE AERO ENGINE

(71) Applicant: ROLLS-ROYCE plc, London (GB)

(72) Inventor: Joseph B. Cooper, Derby (GB)

(73) Assignee: Rolls-Royce plc, London (GB)

( * ) Notice: Subject to any disclaimer, the term of this patent is extended or adjusted under 35 U.S.C. 154(b) by 415 days.

(21) Appl. No.: 16/396,923

(22) Filed: Apr. 29, 2019

(65) Prior Publication Data
US 2019/0359342 A1 Nov. 28, 2019

(30) Foreign Application Priority Data

May 24, 2018 (GB) .................................. 1808514

(51) Int. Cl.
| | | |
|---|---|---|
| *B64D 27/26* | (2006.01) |
| *F01D 25/28* | (2006.01) |
| *F02C 7/20* | (2006.01) |
| *F02C 7/268* | (2006.01) |

(52) U.S. Cl.
CPC ............ B64D 27/26 (2013.01); F01D 25/285 (2013.01); F02C 7/20 (2013.01); F02C 7/268 (2013.01); *B64D 2027/262* (2013.01)

(58) Field of Classification Search
CPC .......... B64D 27/10; B64D 27/12; B64D 27/14
See application file for complete search history.

(56) References Cited

U.S. PATENT DOCUMENTS

| | | |
|---|---|---|
| 3,042,349 A | 7/1962 | Pirtle et al. |
| 4,461,455 A | 7/1984 | Mills et al. |
| 5,575,607 A | 11/1996 | Grout et al. |
| 5,653,351 A | 8/1997 | Grout et al. |

(Continued)

FOREIGN PATENT DOCUMENTS

| | | |
|---|---|---|
| CN | 103318415 | 9/2013 |
| EP | 2025898 A2 | 2/2009 |

(Continued)

OTHER PUBLICATIONS

Extended European Search Report from counterpart EP Application No. 19171076.3 dated Sep. 26, 2019, 7 pgs. (6710 CSM).

(Continued)

*Primary Examiner* — Timothy D Collins
*Assistant Examiner* — Eric Acosta
(74) *Attorney, Agent, or Firm* — Shumaker & Sieffert, P.A.

(57) ABSTRACT

A system for mounting a gas turbine engine to a pylon on a wing of an aircraft. A temporary forward link, being length-adjustable, and at least one temporary rearward link, being length-adjustable, are provided. These are for temporarily attaching the gas turbine engine to the pylon. The temporary forward link and the temporary rearward link are each adapted to resist tension and compression, to maintain a positional relationship between the gas turbine engine and the pylon in the absence of adjustment of the lengths of the temporary forward link and the temporary rearward link. Adjustment of the length of the temporary links brings engine mounts into alignment with pylon mounts for service attachment of the gas turbine engine to the pylon.

16 Claims, 5 Drawing Sheets

(56) References Cited

U.S. PATENT DOCUMENTS

| | | | | |
|---|---|---|---|---|
| 2011/0259996 A1* | 10/2011 | Vetters | ............... | B64D 27/26 |
| | | | | 244/54 |
| 2013/0287565 A1 | 10/2013 | Suciu et al. | | |
| 2016/0167789 A1* | 6/2016 | Knight | ............... | B64D 13/02 |
| | | | | 454/71 |
| 2016/0376015 A1* | 12/2016 | Lacko | ............... | B64F 5/50 |
| | | | | 29/888.012 |
| 2018/0362174 A1 | 12/2018 | Paolini et al. | | |

FOREIGN PATENT DOCUMENTS

| | | |
|---|---|---|
| WO | 2010007226 A2 | 1/2010 |
| WO | 2015185811 | 12/2015 |

OTHER PUBLICATIONS

Response to Extended European Search Report from counterpart EP Application No. 19171076.3 dated Sep. 26, 2019, filed May 27, 2020, 57 pgs.

Great Britain search report dated Nov. 21, 2018, issued in GB Patent Application No. 1808514.2.

* cited by examiner

MOUNTING SYSTEM AND MOUNTING METHOD FOR GAS TURBINE AERO ENGINE

CROSS-REFERENCE TO RELATED APPLICATIONS

This application is based upon and claims the benefit of priority from United Kingdom patent application Number GB 1808514.2 filed on May 24, 2018, the entire contents of which are incorporated herein by reference.

BACKGROUND

Technical Field

The present disclosure relates to a system for mounting a gas turbine engine with respect to a wing of an aircraft. Also disclosed are a method for mounting a gas turbine engine with respect to a wing of an aircraft and an aircraft in a state in which a gas turbine engine is temporarily mounted with respect to a wing of the aircraft.

Description of the Related Art

In typical modern multi-engine aircraft, gas turbine engines are suspended from pylons that extend forwardly from the wings of the aircraft. Each engine may weigh about 6,000-8,000 kg for example. Therefore, mounting the engine onto the pylon is a major operation. Such mounting is carried out during aircraft assembly. During major servicing, the engine may be removed from the aircraft and the same engine re-attached or another engine attached in its place. It is therefore of interest to provide an approach to engine mounting that is efficient and avoids the likelihood of damage to the engine, pylon or mounting components.

A known method for engine installation onto the pylon/wing is to use 'bootstrapping', a method where a framework is attached to the pylon. Pulleys are provided at four corners defined by the framework. Chains are fed over the pulleys and attach to the engine. The engine can then be lifted using the chains into the correct position.

However, the installation of the required framework leads to difficulties in particular for core mounted engines, in which case the pylon of the aircraft typically does not have sufficient height for the 'bootstrap' framework to be mounted as well as the engine. Furthermore, for some engines the centre of gravity is close to the front engine mount. This can lead to problems in the control of rocking of the engine as the engine pivots about the centre of gravity/front mount location.

An alternative approach is to use a ground-based lifting system which uses a framework to lift the engine at four corner points, up to the pylon. Such a ground-based lifting system is typically very large and expensive and cannot be easily transported. Such an approach is therefore not favoured by airframers (i.e. companies that build/assemble aircraft). The main disadvantage of such a system, as identified by the present inventor, is that it maintains the engine as a separate system from the pylon and so both items can move independently of each other, making it extremely difficult to align the engine and the pylon with precision.

U.S. Pat. No. 4,461,455 discloses an aircraft engine lifting and positioning apparatus that minimises damage caused by inadvertent forced misalignment. This apparatus is of the ground-based type mentioned above, the apparatus providing air cushion bearings for cushioning of the engine as it is lifted and positioned.

U.S. Pat. No. 5,575,607 discloses a jet engine transport vehicle lift system and a build cell that uses visual alignment assisted by alignment rods. The lift system is disclosed as being operable to hold the engine during removal from an aircraft and during subsequent re-mounting to an aircraft.

International patent application WO 2015/185811 A1 discloses a cradle assembly for handling an aircraft engine. The assembly has a chassis and four actuators, arranged two by two, secured to the chassis.

Chinese patent application CN 103318415 A discloses a system for mounting a gas turbine engine to an aircraft at forward and rearward mounting positions. The system employs lower guide rails, rollers, short rods, long rods, guy cables, upper guide rails, winding drums, motors, an engine, scissors fork mechanisms and drive control mechanisms.

It is designed to be completely collapsible in order to use the radial space between the engine and the aircraft.

The present disclosure is made in the light of the insight explained above.

SUMMARY

According to a first aspect there is provided a system for mounting a gas turbine engine to a pylon on a wing of an aircraft, the pylon having a forward pylon mount and a rearward pylon mount, the gas turbine engine having a forward engine mount for service attachment to the forward pylon mount and a rearward engine mount for service attachment to the rearward pylon mount, the system comprising at least one temporary forward link, being length-adjustable, and at least one temporary rearward link, being length-adjustable, for temporarily attaching the gas turbine engine to the pylon via the at least one temporary forward link and the temporary rearward link, wherein the at least one temporary forward link and the temporary rearward link are each adapted to resist tension and compression, to maintain a positional relationship between the gas turbine engine and the pylon in the absence of adjustment of the lengths of the at least one temporary forward link and the at least one temporary rearward link, wherein:

the system provides a positional relationship between the gas turbine engine and the pylon such that the forward engine mount is out of alignment with the forward pylon mount and/or the rearward engine mount is out of alignment with the rearward pylon mount, adjustment of the length of at least one of the temporary forward link and the temporary rearward link is operable to bring the forward engine mount into alignment with the forward pylon mount and/or the rearward engine mount into alignment with the rearward pylon mount for service attachment of the gas turbine engine to the pylon, and the at least one temporary forward link and the at least one temporary rearward link are removable from the gas turbine engine and from the pylon.

According to a second aspect there is provided a method for mounting a gas turbine engine to a pylon on a wing of an aircraft, the pylon having a forward pylon mount and a rearward pylon mount, the gas turbine engine having a forward engine mount for service attachment to the forward pylon mount and a rearward engine mount for service attachment to the rearward pylon mount, the method comprising:

providing at least one temporary forward link, being length-adjustable, and at least one temporary rearward link, being length-adjustable, presenting the gas turbine engine to the pylon, in a state in which the forward engine mount is out of alignment with the forward pylon mount and/or the rearward engine mount is out of alignment with the rearward pylon mount, temporarily attaching the gas turbine engine to the pylon via the at least one temporary forward link and the at least one temporary rearward link, wherein the at least one temporary forward link and the at least one temporary rearward link are each adapted to resist tension and compression, to maintain a positional relationship between the gas turbine engine and the pylon in the absence of adjustment of the lengths of the at least one temporary forward link and the at least one temporary rearward link, adjusting the length of at least one of the temporary forward link and the temporary rearward link to bring the forward engine mount into alignment with the forward pylon mount and/or the rearward engine mount into alignment with the rearward pylon mount for service attachment of the gas turbine engine to the pylon, conducting service attachment of the gas turbine engine to the pylon, removing the at least one temporary forward link and the at least one temporary rearward link.

According to a third aspect there is provided an aircraft in a state in which a gas turbine engine is temporarily mounted to a pylon on a wing of the aircraft, the pylon having a forward pylon mount and a rearward pylon mount, the gas turbine engine having a forward engine mount for service attachment to the forward pylon mount and a rearward engine mount for service attachment to the rearward pylon mount, a positional relationship between the gas turbine engine and the pylon being such that the forward engine mount is out of alignment with the forward pylon mount and/or the rearward engine mount is out of alignment with the rearward pylon mount, the aircraft further comprising at least one temporary forward link, being length-adjustable, and at least one temporary rearward link, being length-adjustable, the gas turbine engine being temporarily attached to the pylon via the at least one temporary forward link and the at least one temporary rearward link, wherein the at least one temporary forward link and the at least one temporary rearward link are each adapted to resist tension and compression, to maintain the positional relationship between the gas turbine engine and the pylon in the absence of adjustment of the lengths of the at least one temporary forward link and the at least one temporary rearward link, wherein:

adjustment of the length of at least one of the temporary forward link and the temporary rearward link is operable to bring the forward engine mount into alignment with the forward pylon mount and/or the rearward engine mount into alignment with the rearward pylon mount for service attachment of the gas turbine engine to the pylon, and the at least one temporary forward link and the at least one temporary rearward link are removable from the gas turbine engine and from the pylon.

Any aspect of the disclosure may be combined with any other aspect of the present disclosure, unless the context demands otherwise.

Optional features of the present disclosure will now be set out. These are applicable singly or in any combination with any aspect of the present disclosure.

In this disclosure, it is intended that 'service attachment' of the gas turbine engine to the pylon (or more generally to the wing, or still more generally to the aircraft) refers to an attachment of the engine to the aircraft in a manner suitable for operation of the aircraft, including for flight of the aircraft, powered at least in part by the gas turbine engine.

There may be provided two temporary rearward links. These may be disposed on lateral sides of the pylon with respect to the forwards-rearwards direction of the aircraft and engine.

There may be provided one temporary forward link. This may be disposed at the forward end of the pylon. The temporary forward link may be disposed aligned with and above a central axis of the engine.

For service attachment of the gas turbine engine to the pylon, the forward engine mount may attach to the forward pylon mount via at least one mounting pin extending through corresponding mounting pin apertures in the forward engine mount and the forward pylon mount. Alignment of the forward engine mount and the forward pylon mount may therefore correspond to alignment of the mounting pin apertures. The at least one mounting pin may be inserted into the mounting pin apertures along a forward-rearward direction with respect to the aircraft and engine.

The gas turbine engine may be a core mounted gas turbine engine. The forward engine mount may be disposed at an intercase of the gas turbine engine. The rearward engine mount may be disposed at a tail bearing housing of the gas turbine engine.

There may be provided forward link attachment tooling at a forward region of the pylon for the at least one temporary forward link. The forward link attachment tooling may be removable from the pylon when the gas turbine engine is configured in service attachment to the pylon.

There may be provided rearward link attachment tooling at a rearward region of the pylon for the (or each) temporary rearward link. The (or each) rearward link attachment tooling may be removable from the pylon when the gas turbine engine is configured in service attachment to the pylon.

There may be provided rearward link engine attachment tooling at a rearward region of the engine for the temporary rearward link. The rearward link attachment tooling may be removable from the engine when the gas turbine engine is configured in service attachment to the pylon.

As explained above, the at least one temporary forward link is capable of being length-adjusted. The at least one temporary forward link may therefore include a first rigid member and a second rigid member that are adjustable in position relative to each other and are securable to each other in a range of positions relative to each other. In this way, the adjustment of position of the first rigid member and the second rigid member leads to adjustment of the length of the at least one temporary forward link. Similar considerations apply to the at least one temporary rearward link.

The at least one temporary forward link may comprise a screw thread to allow adjustment of the length of the at least one temporary forward link. For example, the first rigid member may comprise a screw threaded male member. This may cooperate with a corresponding female screw threaded member. Relative rotation of the first and second rigid members may then provide the required length adjustment. Similar considerations apply to the temporary rearward link.

Alternative configurations for the at least one temporary forward link are envisaged. For example, the at least one temporary forward link may comprise a ball screw arrangement. The at least one temporary forward link may comprise a pneumatic piston arrangement or air ram arrangement. The at least one temporary forward link may comprise a hydraulic piston arrangement. Similar considerations apply to the at least one temporary rearward link.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

It is to be understood here that the gearbox used to drive the fan is different from the accessory gearbox. The expression "gearbox" used in this specification is to be understood as the gearbox used to drive the fan (unless the context demands otherwise) and the expression "accessory gearbox" used in this specification is to be understood as that used to drive the accessories.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds)), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, or 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 2250 cm to 300 cm (for example 2450 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 3320 cm to 380 cm may be in the range of from 1200 rpm to 2000 rpm, for example in the range of from 1300 rpm to 1800 rpm, for example in the range of from 1400 rpm to 18600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will be described by way of example only with reference to the accompanying drawings. In the drawings.

DETAILED DESCRIPTION

The system, method and aircraft of the present disclosure will now be described by way of example only, with reference to the drawings.

Figure 1:
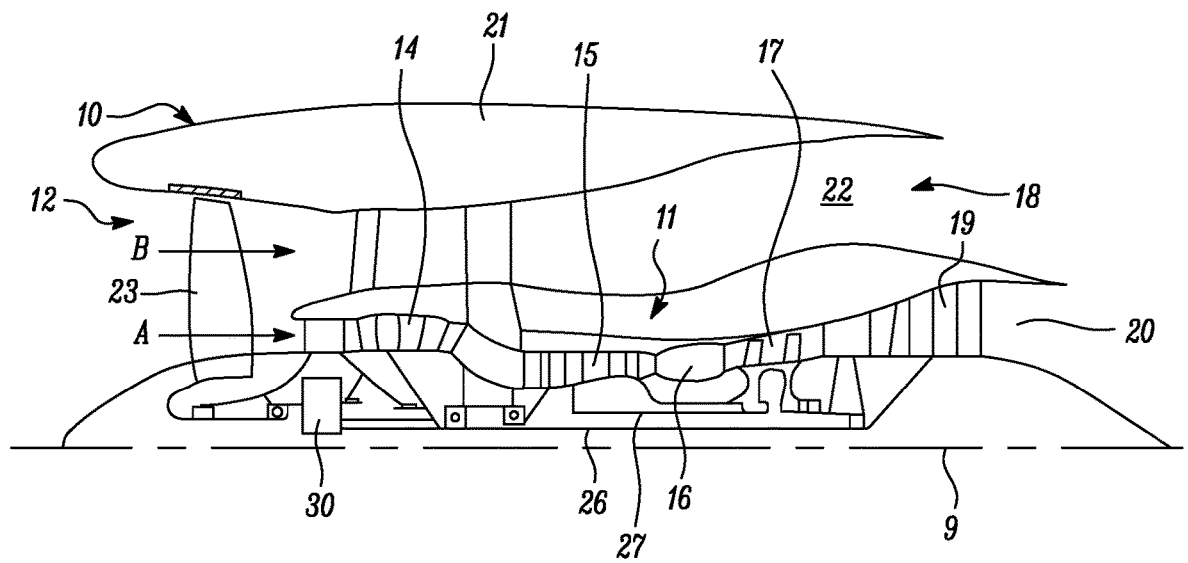
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
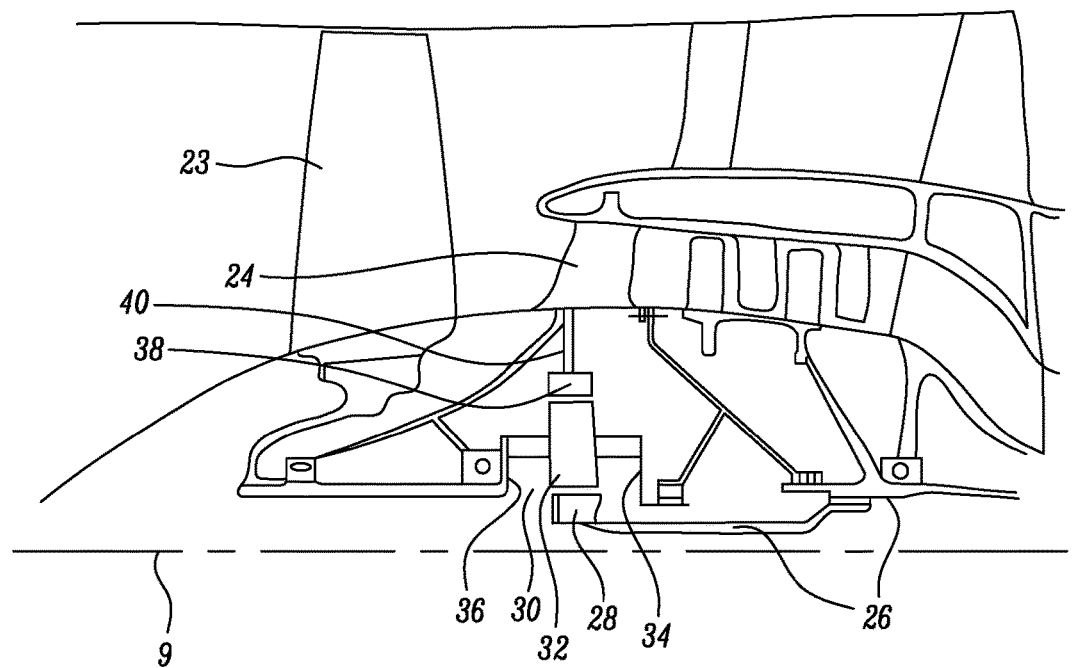
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
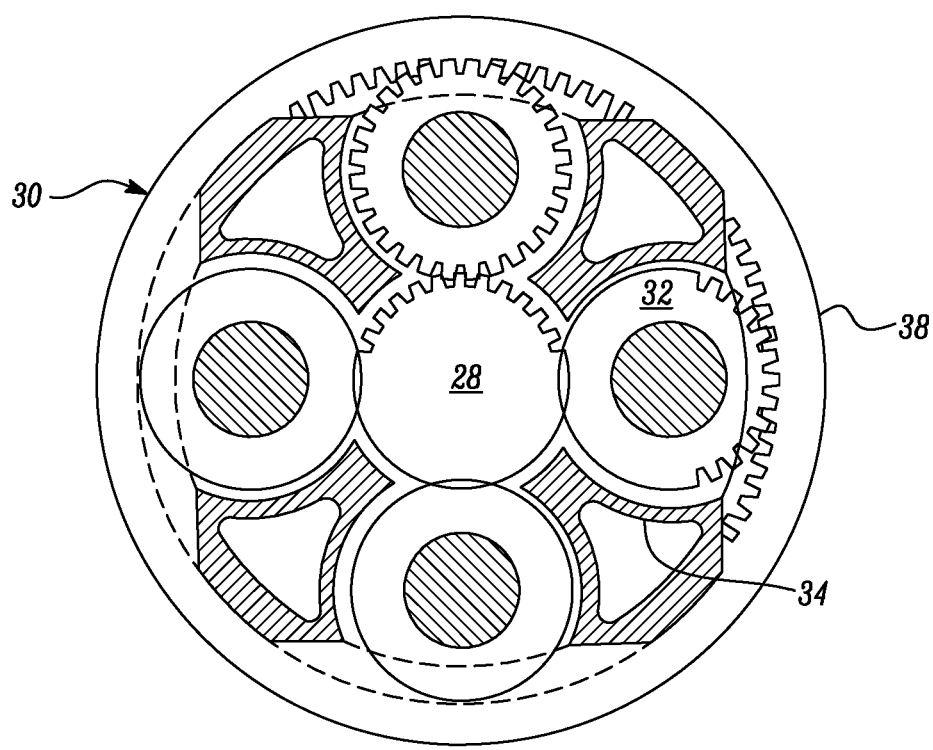
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Considering a gas turbine engine as illustrated in FIGS. 1-3, there is now set out disclosure relating to the installation of such an engine for service on an aircraft.

The disclosure provides a method for aligning mount pins installation of the engine, as will be described with respect to FIGS. 4 and 5. The disclosure is particularly useful in terms of its ability to align pin holes used for service attachment of the engine to the pylon. Such alignment can be carried out precisely and therefore avoid damaging hardware. In general terms, the system described combines the airframe (in this case, the wing) and the engine into a single entity ahead of aligning the pin holes, thereby avoiding a problem of the wing moving relative to the engine during mounting of the engine on the wing.

Figure 4:
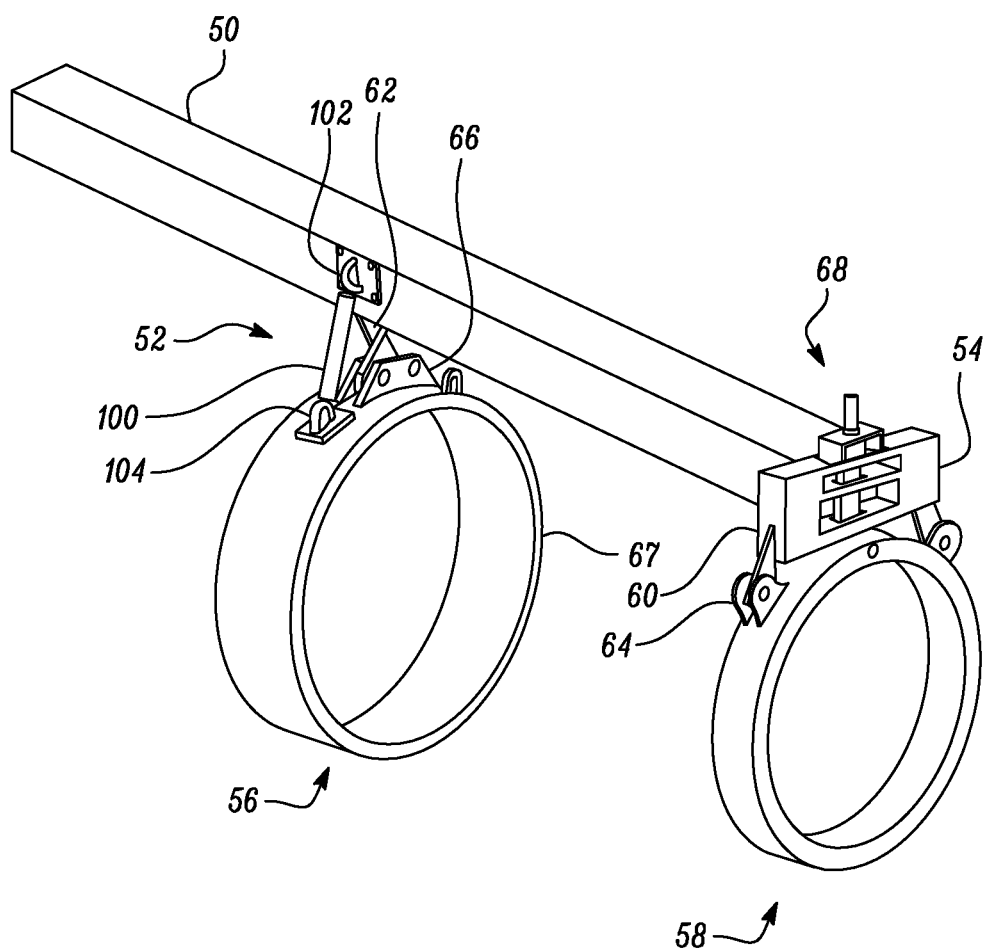
FIG. 4 is a schematic view of an arrangement of a pylon, mounting system and the mounting regions of a gas turbine engine.

FIG. 4 is a schematic view of an arrangement of a pylon 50, mounting system 52, 54 and the mounting regions 56, 58 of a gas turbine engine. The mounting system 52, 54 disclosed is for mounting a gas turbine engine 10 (but not shown in full in FIGS. 4 and 5) to a pylon 50 on a wing (not shown) of an aircraft (not shown). Pylon 50 has a forward pylon mount 60 and a rearward pylon mount 62, the gas turbine engine having a forward engine mount 64 for service attachment to the forward pylon mount 60 and a rearward engine mount 66 for service attachment to the rearward pylon mount 62.

A temporary forward link 68 is provided. This is shown in more detail in FIG. 5. The temporary forward link is disposed aligned with and above a central axis of the engine. Temporary forward link 68 comprises first member 70 having a screw thread (not shown). First member 70 is formed integrally with or is attached to translation member 72 that extends through corresponding apertures 74 in forward mount bracket 76. At its lower end, translation member 72 is insertable into a corresponding vertical aperture in and engine case (specifically in this embodiment the intercase 80) of the engine. The intercase 80 has a horizontal eye hole 82. The lower end of the translation member has an eye hole 78. Suitable alignment of the lower end of the translation member 72 in the vertical aperture in the intercase allows alignment of the intercase horizontal eye hole 82 and the translation member eye hole 78, allowing insertion of mounting pin 79 into the intercase horizontal eye hole 82 and the translation member eye hole 78.

First member 70 of the temporary forward link 68 extends through a ball screw 84 held in ball screw bracket 86 at an upper side of the forward mount bracket 76. Adjustment of the ball screw 84 with respect to the first member 70 therefore provides adjustment of the length of the first member extending between the ball screw 84 of the translation member 72. In turn, this length adjustment therefore provides fine positional control of the intercase 80 (and hence the engine) with respect to the pylon 50.

Figure 5:
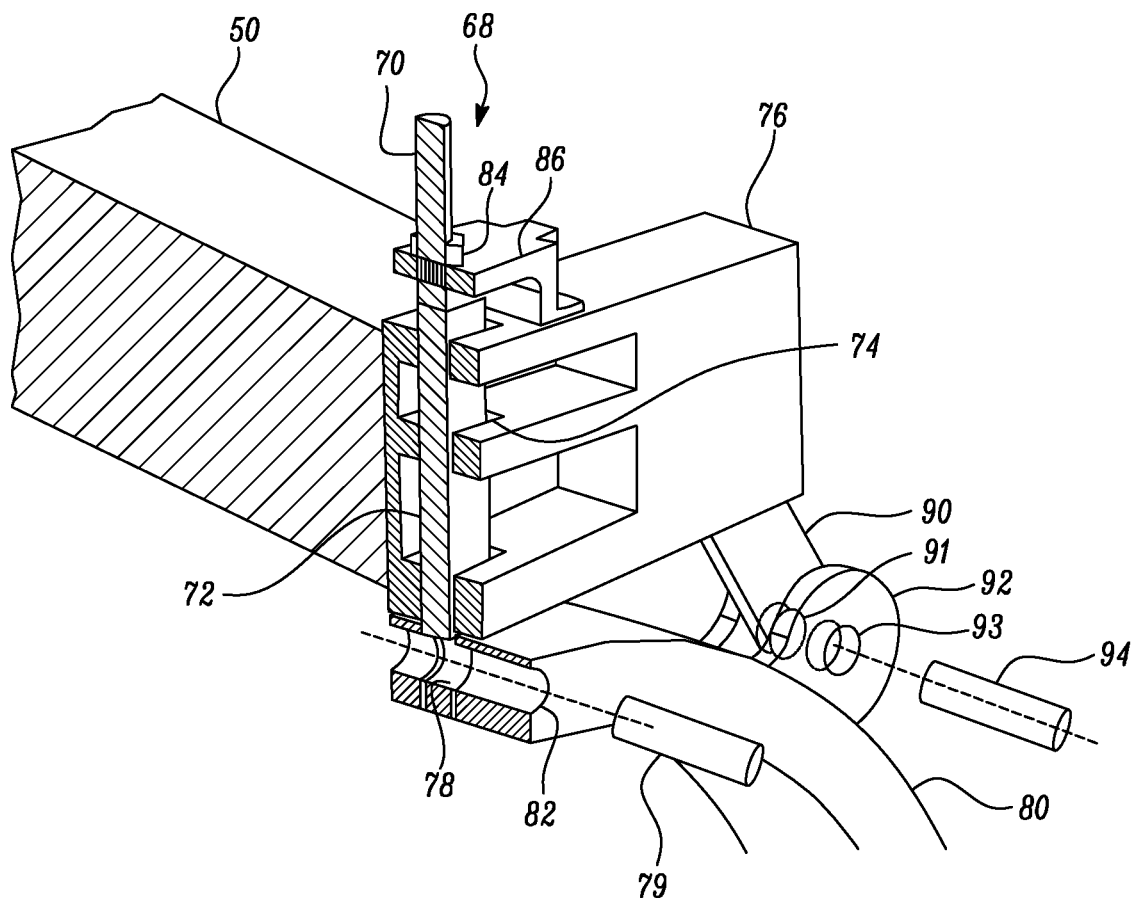
FIG. 5 is a schematic enlarged partial cutaway view of a forward engine mount and forward pylon mount, showing additional detail compared with FIG. 4.
Figure 6:
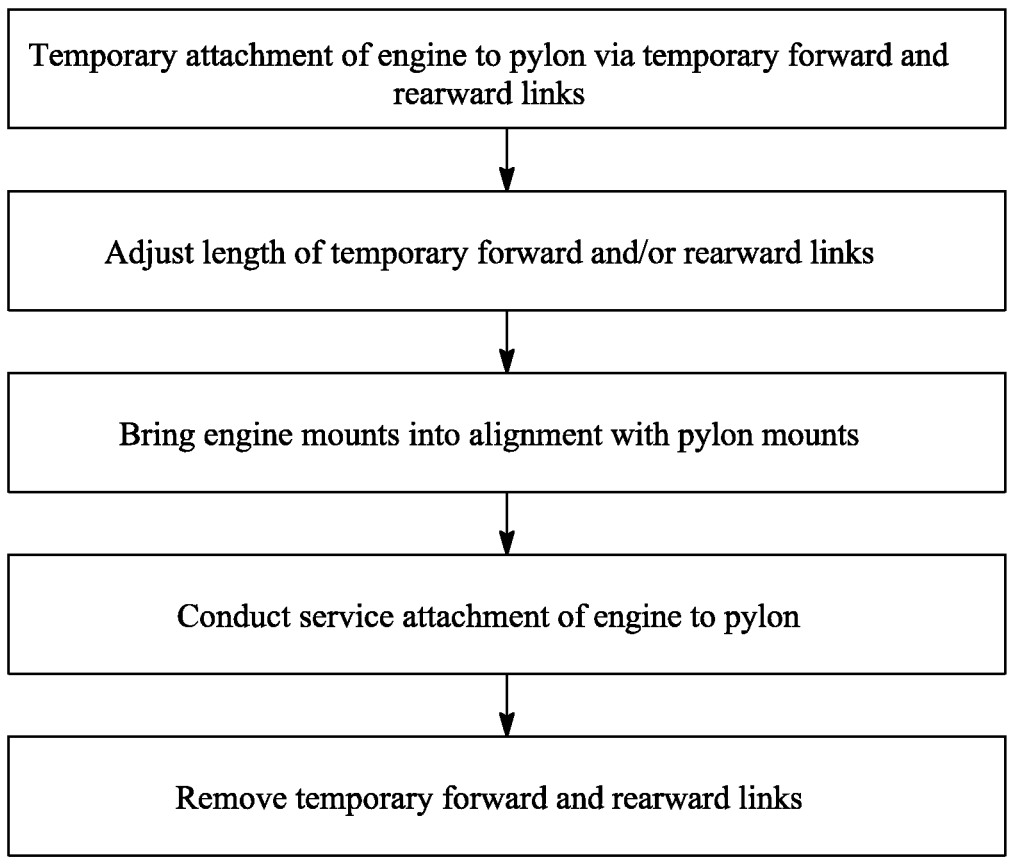
FIG. 6 shows a schematic flow diagram illustrating a method according to an embodiment.

One forward pylon mount 90 is shown in FIG. 5. One forward engine mount 92 is also shown in FIG. 5, attached to intercase 80. Forward engine mount 92 has forward engine mount aperture 93 for alignment with forward pylon mount aperture 91 (shown in ghosted outline in FIG. 5). For service attachment of the engine to the aircraft, it is necessary to bring apertures 91 and 93 into alignment and insert service mounting pin 94 into the aligned apertures. Suitable alignment is achieved in part by adjustment of the temporary forward link 68. Alignment may further be achieved in part by suitable adjustment of the temporary rearward links, described below. After suitable service mounting of the engine, the temporary forward link 68 can be removed from the pylon and from the engine.

In the present embodiment, there are provided two temporary rearward links 100, only one of these being seen in FIG. 4. The temporary rearward links 100 are disposed on lateral sides of the pylon 50 with respect to the forwards-rearwards direction of the aircraft and engine. Accordingly, the temporary rearward links are disposed above but laterally offset from a central axis of the engine.

Rearward engine mount 66 is disposed at tail bearing housing 67 of the gas turbine engine. In other embodiments, the rearward engine mount can be disposed at one or more other engine casings.

Rearward link pylon attachment tooling 102 is provided on the pylon. The rearward link pylon attachment tooling 102 is removable from the pylon when the gas turbine engine is configured in service attachment to the pylon. Rearward link engine attachment tooling 104 is provided on the tail bearing housing 67 of the engine for the temporary rearward link 100. The rearward link engine attachment tooling 104 is removable from the engine when the gas turbine engine is configured in service attachment to the pylon.

In a similar manner to the temporary forward link described above, each temporary rearward link 100 is capable of being length-adjusted in order to adjust the position of the engine with respect to the pylon. Adjustment of the temporary rearward links 100 and the temporary forward link 68 allows suitable fine alignment of the forward engine mount with the forward pylon mount and of the rearward engine mount with the rearward pylon mount, for service attachment.

The aircraft wing, pylon and pylon mounts can be considered to be a first sub-system and the engine can be considered to be a second sub-system, both sub-systems being independently located in space. In the approach of the present disclosure, the two sub-systems are firstly joined together to then allow them to be accurately located with respect to each other.

The engine is offered up to the pylon from the ground on a transportation/installation stand (not shown). This is simply a basic frame which is able to lift the engine towards the pylon but does not require particularly good accuracy. Once the engine mount to pylon mount distance is within (for example) only +/−20 mm of pin hole alignment, the forward and rearward adjustable length links can be installed between the pylon (first sub-system) and the engine (second sub-system). This is simple for the operator to achieve because the links can be adjusted in length and manipulated in terms of angles until they reach the desired attachment point. The rear attachment points are pre-fitted/bolted to the pylon and tail bearing housing to save time when installing the engine. The front attachment point is a permanent feature on the intercase (aperture 82). Once the adjustable links are attached, they can be tightened until they support the weight of the engine in a stable manner. The engine stand can then be removed. The two sub-systems are now combined, which removes the effect of relative movements of each sub-system and therefore makes the accurate pin holes easier to align. For example, wind blowing the wing will no longer move the engine mount link holes relative to the engine mount pin holes on the tail bearing housing or intercase.

The three adjustable links are then adjusted to align the mounting holes very accurately, e.g. to an industry standard pin fit tolerance. As each of the pin holes aligns, a pin (e.g. pin 94) can be inserted and fine adjustments made to allow the pin to be inserted without damaging it or the structure it is being installed in to. When all four engine mount pins are installed (two at the front and two at the rear), the adjustable links are slackened off and removed. The attachment and adjustment tooling brackets can then also be removed, reducing the weight impact on the engine design.

For engine removal, the tooling can be used to relieve the weight on the engine mount pins, to reduce the chances of damage as they are extracted. The process is the reverse of installation as described above.

The use of rigid (but length-adjustable) links also enables better control for engine manipulation about the centre of gravity, as they are able to take compressive force as well as tensile, unlike 'bootstrap' methods. This means that no counter weights are needed to allow for control of the engine position about its centre of gravity. This is particularly relevant for engines with large fan diameters, as is the case for geared fan engines as described above.

Note that the tail bearing housing 67 and the intercase 80 are parts of an assembled gas turbine engine. FIGS. 4 and 5 only show those parts of the engine that are involved in installing the engine onto the pylon.

It is considered that an advantage of the system disclosed here is that it provides excellent control of the alignment of the engine to the mounts/pylon and therefore reduces the risk of damage to the engine mount features and pins, making the product/engine safer.

There have been industry examples in the past where pins have been forced in without the holes being properly aligned and the pins have been damaged, leading to the loss of an engine and consequently loss of the aircraft.

Another advantage of the system disclosed here is that it allows more stable control, allowing controlled transfer of load from one set of mounts (temporary or service) to another, making it safer for the fitters who are installing/removing the engine, because there are typically no sudden releases as a pin is extracted.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A system for mounting a gas turbine engine to a pylon on a wing of an aircraft, the pylon having a forward pylon mount and a rearward pylon mount, the gas turbine engine having a forward engine mount for service attachment to the forward pylon mount and a rearward engine mount for service attachment to the rearward pylon mount,
the system comprising at least one temporary forward link, being length-adjustable, and at least one temporary rearward link, being length-adjustable, for temporarily attaching the gas turbine engine to the pylon via the at least one temporary forward link and the at least one temporary rearward link, wherein the at least one temporary forward link and the at least one temporary rearward link are each adapted to resist tension and compression, to maintain a positional relationship between the gas turbine engine and the pylon in the absence of adjustment of the lengths of the at least one temporary forward link and the temporary rearward link,
wherein:
the system provides a positional relationship between the gas turbine engine and the pylon such that the forward engine mount is out of alignment with the forward pylon mount and/or the rearward engine mount is out of alignment with the rearward pylon mount,
adjustment of the length of at least one of the temporary forward link and the temporary rearward link is operable to bring the forward engine mount into alignment with the forward pylon mount and/or the rearward engine mount into alignment with the rearward pylon mount for service attachment of the gas turbine engine to the pylon, and
the at least one temporary forward link and the at least one temporary rearward link are removable from the gas turbine engine and from the pylon.

2. The system of claim 1 wherein there are provided two temporary rearward links, disposed on lateral sides of the pylon with respect to the forwards-rearwards direction of the aircraft and engine.

3. The system of claim 1 wherein there is provided one temporary forward link, disposed at the forward end of the pylon.

4. The system of claim 3 wherein the temporary forward link is aligned with a central axis of the engine and above the engine along the pylon.

5. The system of claim 1 wherein, for service attachment of the gas turbine engine to the pylon, the forward engine mount attaches to the forward pylon mount via at least one mounting pin extending through corresponding mounting pin apertures in the forward engine mount and the forward pylon mount.

6. The system of claim 1 wherein the gas turbine engine is a core mounted gas turbine engine.

7. The system of claim 1 wherein there is provided forward link attachment tooling at a forward region of the pylon for the at least one temporary forward link, the forward link attachment tooling being removable from the pylon when the gas turbine engine is configured in service attachment to the pylon.

8. The system of claim 1 wherein there is provided rearward link pylon attachment tooling at a rearward region of the pylon for the at least one temporary rearward link, the rearward link pylon attachment tooling being removable from the pylon when the gas turbine engine is configured in service attachment to the pylon.

9. The system of claim 1 wherein there is provided rearward link engine attachment tooling at a rearward region of the engine for the at least one temporary rearward link, the rearward link attachment tooling being removable from the engine when the gas turbine engine is configured in service attachment to the pylon.

10. The system of claim 1 wherein the at least one temporary forward link includes a first rigid member and a second rigid member that are adjustable in position relative to each other and are securable to each other in a range of positions relative to each other in order to effect adjustment of the length of the at least one temporary forward link.

11. The system of claim 1 wherein the at least one temporary rearward link includes a first rigid member and a second rigid member that are adjustable in position relative to each other and are securable to each other in a range of positions relative to each other in order to effect adjustment of the length of the at least one temporary rearward link.

12. The system of claim 1 wherein the at least one temporary forward link and/or the at least one temporary rearward link comprise one or more of a screw thread arrangement, a ball screw arrangement, a pneumatic piston arrangement or air ram arrangement, or a hydraulic piston arrangement.

13. A method for mounting a gas turbine engine to a pylon on a wing of an aircraft, the pylon having a forward pylon mount and a rearward pylon mount, the gas turbine engine having a forward engine mount for service attachment to the forward pylon mount and a rearward engine mount for service attachment to the rearward pylon mount, the method comprising:
providing at least one temporary forward link, being length-adjustable, and at least one temporary rearward link, being length-adjustable,
presenting the gas turbine engine to the pylon, in a state in which the forward engine mount is out of alignment with the forward pylon mount and/or the rearward engine mount is out of alignment with the rearward pylon mount,
temporarily attaching the gas turbine engine to the pylon via the at least one temporary forward link and the temporary rearward link, wherein the at least one temporary forward link and the temporary rearward link are each adapted to resist tension and compression, to maintain a positional relationship between the gas turbine engine and the pylon in the absence of adjustment of the lengths of the at least one temporary forward link and the at least one temporary rearward link,
adjusting the length of at least one of the temporary forward link and the temporary rearward link to bring the forward engine mount into alignment with the forward pylon mount and/or the rearward engine mount into alignment with the rearward pylon mount for service attachment of the gas turbine engine to the pylon, conducting service attachment of the gas turbine engine to the pylon, removing the at least one temporary forward link and the at least one temporary rearward link.

14. An aircraft in a state in which a gas turbine engine is temporarily mounted to a pylon on a wing of the aircraft, the pylon having a forward pylon mount and a rearward pylon mount, the gas turbine engine having a forward engine mount for service attachment to the forward pylon mount and a rearward engine mount for service attachment to the rearward pylon mount, a positional relationship between the gas turbine engine and the pylon being such that the forward engine mount is out of alignment with the forward pylon mount and/or the rearward engine mount is out of alignment with the rearward pylon mount, the aircraft further comprising at least one temporary forward link, being length-adjustable, and at least one temporary rearward link, being length-adjustable, the gas turbine engine being temporarily attached to the pylon via the at least one temporary forward link and the at least one temporary rearward link, wherein the at least one temporary forward link and the at least one temporary rearward link are each adapted to resist tension and compression, to maintain the positional relationship between the gas turbine engine and the pylon in the absence of adjustment of the lengths of the at least one temporary forward link and the at least one temporary rearward link, wherein:

adjustment of the length of at least one of the temporary forward link and the temporary rearward link is operable to bring the forward engine mount into alignment with the forward pylon mount and/or the rearward engine mount into alignment with the rearward pylon mount for service attachment of the gas turbine engine to the pylon, and the at least one temporary forward link and the at least one temporary rearward link are removable from the gas turbine engine and from the pylon.

15. The aircraft of claim 14 wherein the gas turbine engine further comprises:

an engine core comprising a turbine, a compressor, and a core shaft connecting the turbine to the compressor;

a fan located upstream of the engine core, the fan comprising a plurality of fan blades; and a gearbox that receives an input from the core shaft and outputs drive to the fan so as to drive the fan at a lower rotational speed than the core shaft.

16. The aircraft of claim 15 wherein:

the turbine is a first turbine, the compressor is a first compressor, and the core shaft is a first core shaft;

the engine core further comprises a second turbine, a second compressor, and a second core shaft connecting the second turbine to the second compressor; and the second turbine, second compressor, and second core shaft are arranged to rotate at a higher rotational speed than the first core shaft.

\* \* \* \* \*